United States Patent Office 3,375,234
Patented Mar. 26, 1968

3,375,234
RUBBER CURING SYSTEMS
Samuel Gelfand, Niagara Falls, N.Y., assignor to Hooker Chemical Corporation, Niagara Falls, N.Y., a corporation of New York
No Drawing. Filed Feb. 26, 1964, Ser. No. 347,359
17 Claims. (Cl. 260—79.5)

This invention relates to improvements in the vulcanization of elastomeric polymers and copolymers by sulfur and a polyhaloaliphatic compound.

The vulcanization of highly unsaturated elastomers such as natural rubber with sulfur and certain moderating accelerators, such as derivatives of guanidine and thiazole, is known. Also known is the vulcanization of rubber having low unsaturation by using sulfur, zinc oxide and an accelerator, such as thiuram derivatives and dithiocarbamates. These systems are not effective for saturated polymers since no useful vulcanizates are formed. Also known is the vulcanization of saturated polymers by peroxides such as dicumyl peroxide, alone or in combination with sulfur. Recently, octachloropropane and octachlorocyclopentene, in combination with sulfur, have been found to be useful vulcanizing agents for saturated polymers. However, the vulcanizates formed by vulcanizing saturated polymers with these curing systems are deficient in certain properties as compared to peroxide vulcanizates. Among the deficiencies noted is the much lower state of cure, i.e., vulcanization.

It is an object of this invention to obtain improved chlorocarbon cures. Also an object is to obtain vulcanizates with higher states of cure.

A further object is to obtain vulcanizates with tensile properties and state of cure comparable to such properties of those cured with peroxides. Further objects will be apparent from the following discussion.

Now there has been found a polyhaloaliphatic compound which in combination with sulfur is satisfactory for the vulcanization of saturated polymers so that the resulting vulcanizate has a state of cure comparable to that obtained when a peroxide curative is employed (gives a significantly improved state of cure as compared to known chlorocarbon cures). The vulcanizates of this invention have a high degree of cross linking as evidenced by good low temperature flexibility, absence of mold staining, permit higher loadings with pigment without loss of physical properties and high modulus.

Modulus is defined by Americal Society for Testing Materials Specification D 412–51T as the amount of pull in pounds per square inch required to stretch the test piece of a given elongation.

In accordance with this invention, there is provided a composition which can be vulcanized comprising decachlorobutane in combination with sulfur and an elastomeric composition. Preferably from 0.1 to 30 parts of decachlorobutane ($C_4Cl_{10}$) are mixed with sulfur and 100 parts elastomer, while better products are obtained when the decachlorobutane is employed in an amount from 0.5 to 10 parts. Suitably, the amount of sulfur will be between 0.1 and 10.0 parts and preferably from 0.5 to 5.0 parts. The resulting mixture is then cured by heating to a vulcanized product. To further improve the process, zinc oxide, and metallic accelerators, such as ferric chloride, in various amounts, can be added to the mixture.

The elastomers suitable for use in this invention include polyisobutylene and the nearly amorphous polymers and copolymers of alpha olefins, such as polyethylene and polypropylene, ethylene-propylene copolymers (EPR), ethylene-propylene-minor amount nonconjugated diene terpolymer (EPT) and polymers and copolymers derived from other alpha olefins containing three to five carbon atoms, such as butene-1 and pentene-1. Additionally, polyisobutylene, polybutadiene, ethylene propylene terpolymers and unsaturated ether polymers are suitable for use with this invention. Polyethylene, polypropylene and EPR polymers are very desirable for use in this invention. The alpha olefin polymers may be produced with organo-metallic catalysts and supported metal oxide catalysts, as described in great detail in the text Linear and Stereoregular Addition Polymers; Polymerization with Controlled Propagation, Gaylord, N. G. and Mark, H. F., Interscience Publishers, New York, 1959. Monomers of the type disclosed hereinbefore are readily polymerized to solid polymers. The reaction is carried out in the presence of an inert hydrocarbon diluent, suitably purified of catalyst poisons, at a temperature in the range of 50 to 230 degrees centigrade. At the conclusion of the reaction, the polymer can be removed from the resulting solution or suspension by evaporation of the diluent, whereupon the polymer is treated for removal of catalyst residues.

The elastomeric composition may be prepared by using conventional compounding and mixing equipment of the rubber manufacturing industry. Ingredients and processing procedures are described in the Vanderbilt Rubber Handbook (6th edition), R. T. Vanderbit, New York, 1958.

When the elastomeric composition is mixed on a mill, the polymer is banded on the slow roll and decachlorobutane and sulfur are added. Cutting and blending the cuts three-fourths of the way across the roll gives uniform mixing. However, the batch should not be cut when dry pigments are present in the rolling bank. Half of the filling pigment is then added, cut and blended into the batch, and then the procedure is repeated for the second half. Softeners, waxes, and accelerators may be added in that order. The batch is then cut, blended and refined until it is a uniform composition. Time to complete the mixing is based on the time taken to blend in all of these ingredients properly, and yet not initiate cross linking of the composition. A typical mixing temperature range for mill mixing of elastomeric compositions is from about 50 to 80 degrees centigrade, while temperatures employed by "internal" mixers may exceed 135 degrees centigrade.

In addition, one can also obtain improved results by subjecting the polymer and the decachlorobutane of the invention to an operation called "master batching" prior to incorporation of the other ingredients. The compositions of this invention were prepared using the above-described methods.

It is often advantageous to add pigments, oils and other compounding ingredients to the elastomeric composition in order that the most useful properties for a particular application be obtained. The fillers which can be used include various carbon blacks, clay (both hard and soft), silicas, and whitings. The best results are obtained when the semi-reinforcing and high reinforcing furnace and channel blacks, commonly known as super abrasion furnace (SAF), easy processing channel (EPC), semi-reinforcing furnace (SRF), high abrasion furnace (HAF), and medium processing channel (MPC) are used. The amount of filler used generally ranges up to 200 parts by weight, with the preferred amount being from 20 to 75 parts per 100 parts of elastomer.

It is also advantageous to incorporate into the elastomeric composition metallic accelerators, which include the metals, inorganic metallic compounds and the metallic salts of carboxylic acids. Suitable accelerators are metal halides, as well as the oxides and carbonates, and the metallic salts of alkyl mono- and dicarboxylic acids. Preferably, these accelerators include ferrous oxide, ferric oxide, iron chlorides, zinc chloride, aluminum chloride, iron 2-ethylhexoate, iron tallate, zinc stearate and iron distearate. A suitable amount of these accelerators is from 0.1 to 10 parts, preferably 0.5 to 7 parts.

After making the mixtures of described components by a process such as that described, the elastomeric composition is made into useful articles by shaping and forming the uncured composition. Thereafter, the article is cured or cross linked to permanent shape by the application of controlled amounts of heat and pressure, temperatures of 120 to 195 degrees centigrade and pressures of 25 to 1000 pounds per square inch for two to ninety minutes being useful.

The invention is illustrated by the following non-limiting examples. Temperatures are expressed in degrees centigrade and parts are by weight. All elastomeric formulations are expressed in terms of 100 parts of polymer employed.

EXAMPLES

Table I illustrates and compares the invention with controls using other curing agents. In each case, the cured decachlorobutane composition shows a considerably higher degree of cross linking, i.e., higher state of cure, as evidenced by higher modulus, shorter elongation, better low temperature properties and so forth.

Compositions A and B were tested for brittleness and flexural failure which are functions of cross link density and state of cure. Samples were subjected to temperatures of −40 degrees centigrade. Composition A remained flexible, while Composition B was brittle and cracked when flexed at this temperature. Additional samples were subjected to 180 degree bends at room temperature until failure occurred, as indicated by the appearance of cracks in the rubber. Composition A failed after 14 flexes, whereas Composition B failed after only 7 flexes. The flex life of Composition A is comparable with similar compositions cured with dicumyl peroxide.

A hot master batch of all ingredients common to Compositions C and D was prepared on a large mill. The carbon filled polymer was heated at 105 to 110 degrees centigrade until the weight was constant. The curing ingredients were then mixed on a hot mill. Thereafter, the remaining ingredients of Compositions C and D were added to portions of the hot master batch. This hot milling gave better tensile properties than Compositions H, I and J which were prepared in an identical way on a cold mill. The samples were cured in a "thread" mold and tested for tensile properties in a Model I P-2 Scott Tensile Tester. Typical thread sample cross-sections were 0.025 inch by 0.030 inch. When compared against Composition D, Composition C shows substantially higher modulus values at 200 and 300 percent elongattion. Tensile properties of Compositions C and D were also obtained when the compositions were cured at 145 degrees centigrade for 40 minutes and at 160 degrees centigrade for 20 minutes. Similar better states of cure for decachlorobutane vulcanizates are shown by higher moduli:

TABLE II

| | Cure | | | |
|---|---|---|---|---|
| | 40 Minutes at 145° C. | | 20 Minutes at 160° C. | |
| Composition | C | D | C | D |
| Tensile Strength at Ultimate Elongation (pounds/square inch) | 2,151 | 2,205 | 2,129 | 2,159 |
| Modulus at 300% Elongation (pounds/square inch) | 1,882 | 1,356 | 1,910 | 1,529 |
| Modulus at 200% Elongation (pounds/square inch) | 1,297 | 925 | | |
| Elongation at Break, percent | 322 | 507 | 345 | 419 |

Compositions E, F and G compare various chlorocarbons in an elastomeric composition with substantially higher than normal loadings of carbon black. Composition G, containing decachlorobutane, shows substantially lower loss in tensile strength than Compositions E and F.

Composition K illustrates the use of larger amount of decachlorobutane to achieve a yet higher state of cure in a short time period.

Additional compositions containing decachlorobutane and various elastomers or mixtures of elastomers are shown in Table III.

TABLE I

| | Composition | | | | | | | | | | | |
|---|---|---|---|---|---|---|---|---|---|---|---|---|
| | A | B | C | D | E | F | G | H | I | J | K | L |
| Polyethylene [1] | 100 | 100 | | | | | | | | | | |
| Ethylene-Propylene Rubber [2] | | | 100 | 100 | 100 | 100 | 100 | 100 | 100 | 100 | 100 | 100 |
| SRF Carbon Black | 100 | 100 | | | | | | | | | | |
| HAF Carbon Black | | | 50 | 50 | 125 | 125 | 125 | 50 | 50 | 50 | 50 | 50 |
| Nonyl Phenol | | | | | | | | | | | | 1 |
| Tall Oil | 5 | 5 | 5 | 5 | 5 | 5 | 5 | 5 | 5 | 5 | 5 | 5 |
| Sulfur | 1 | 1 | 1 | 1 | 1 | 1 | 1 | 1 | 1 | 1 | 1 | 1 |
| Ferric Oxide | 5 | 5 | 5 | 5 | 5 | 5 | 5 | 5 | 5 | 5 | 6.6 | 5 |
| Decachlorobutane | 7 | | 5 | | | | 5 | | 5 | | 5 | 5 |
| Octachloropropane | | 7 | | | 5 | | | 5 | | | | |
| Octachlorocyclopentene | | | | | | 5 | | | | 5 | | |
| Properties (press cure, 40 minutes at 160°): | | | | | | | | | | | | |
| Tensile Strength at Ultimate Elongation (pounds/square inch) | 2,338 | 2,432 | 2,446 | 2,318 | 758 | 1,038 | 1,851 | 2,026 | 2,157 | 2,183 | [3] 2,485 | 2,578 |
| Modulus at 200% Elongation | | | 1,441 | 992 | | | | | | 846 | 1,613 | 1,348 |
| Modulus at 300% Elongation | | | 2,070 | 1,512 | | | | 1,196 | 1,703 | 1,230 | 2,383 | 1,965 |
| Elongation at Break, percent | 59 | 68 | 362 | 468 | | | | 502 | 382 | 565 | 317 | 410 |

[1] Alathon, low density, E.I. du Pont de Nemours & Co.
[2] EPR 404, 43% ethylene by weight, ML-4, 100° C., appx. 42, Enjay Chemical Co.
[3] 20 Minutes at 160 degrees centigrade.

TABLE III

| | Composition | | | | | | | | |
|---|---|---|---|---|---|---|---|---|---|
| | M | N | O | P | Q | R | S | T | U |
| Ethylene-Propylene Terpolymer [1] | 100 | 100 | | | | | | | |
| Ethylene-Propylene Copolymer | | | | | | 50 | 50 | | |
| Polyisobutylene [2] | | | 100 | | | 50 | | 50 | |
| Polybutadiene [3] | | | | 100 | 100 | | 50 | 50 | |
| Styrene-Butadiene Copolymer [4] | | | | | | | | | 100 |
| HAF Carbon Black | 50 | 50 | 50 | 50 | 50 | 50 | 50 | 50 | 52 |
| Process Oil | [5] 20 | [5] 20 | | | | | | | [6] 10 |
| Stearic Acid | 1 | 1 | | | | | | | |
| Sulfur | 2 | 2 | 2 | 2 | 1 | 1 | 1 | 2 | 2 |
| Zinc Oxide | 2 | | 2 | 2 | | 2 | 2 | 2 | 2 |
| Ferric Oxide | | | | | 5 | | | | |
| Zinc Carbonate | | 2 | | | | | | | |
| Tall Oil | | | | | 5 | | | | |
| Decachlorobutane | 2 | 2 | 2 | 2 | 5 | 5 | 2 | 2 | 2 |
| Properties: | | | | | | | | | |
| Press Cured at 160° C., minutes | 40 | 40 | 60 | 40 | 40 | 40 | 60 | 30 | 40 |
| Tensile Strength at Ultimate Elongation (pounds/square inch) | 3,240 | 3,061 | 2,161 | 1,311 | 1,200 | 1,702 | 1,207 | 1,188 | 4,086 |
| Modulus at 300% Elongation | 956 | 767 | 1,000 | | | 1,004 | | | 2,442 |
| Elongation at Break, Percent | 743 | 860 | 723 | 188 | 123 | 531 | 207 | 153 | 484 |

[1] Nordel 1070, Specific Gravity 0.85, E. I. du Pont de Nemours & Co.
[2] Butyl 218, Appx. 2.5% Isoprene, ML-8, 100 degrees 71-80, Enjay Chemical Co.
[3] Ameripol CB-220, Cis-1,4 polybutadiene, Goodrich Gulf Chemical Co.
[4] Ameripol 1606 Cold Black Master Batch Oil and Carbon have been separated and shown separately. Goodrich Gulf Chemical Co.
[5] Flexon 846 Petroleum Process Oil, Humble Oil & Refining Co.
[6] High Aromatic Process Oil.

Substantially non-staining vulcanizates were obtained with decachlorobutane as the curing agent. Constantly non-staining vulcanizates were obtained when compounding was carried out at 105 degrees centigrade. No loss of curing agents by volatilization was observed when compounding was carried out at the elevated temperature. On the other hand, octachlorocyclopentene vulcanizates badly stained the chrome plated steel mold. The prior art chlorocarbons also badly stained molds made of steel or aluminum.

The vulcanizates containing decachlorobutane had very smooth shiny surfaces which are comparable to those obtained when the vulcanizate contains a peroxide curative such as dicumyl peroxide. Vulcanizates containing octachloropropane or octachlorocyclopentene are less shiny and have a rougher surface.

It was also surprising to note that vulcanizates containing decachlorobutane showed substantially lower adhesion to the mold and easier mold release than vulcanizates containing octachloropropane and/or octachlorocyclopentene. This unusual property was demonstrated when the various compositions were cured in a substantially flat 2½ inch by 3 inch cavity mold, having a total surface area of approximately 7.5 square inches of which the cavities for four dumbbell specimens take up one square inch. Prior to loading the molds, the mold faces were lightly coated with a silicone mold release composition. The area of contact between the mold faces was 6.5 square inches. A thin layer or flash of elastomeric compositions several mils thick remains in the area of contact between the mold faces after pressure is applied during vulcanization. After curing the compositions containing octachlorocyclopentene and other chlorocarbons, adhesion of this film to both mold faces is strong making separation of the mold faces difficult. However, with decachlorobutane vulcanizates, separation of the mold faces is easy.

Decachlorobutane vulcanizates have a higher state of cure than those vulcanizates which contain chlorocarbons of the prior art. Chlorocarbons such as octachloropropane and octachlorocyclopentene yield vulcanizates having a low state of cure. Mold release of these vulcanizates is relatively difficult and there is a tendency of the vulcanizate to stick to the mold surface because of the relatively high adhesion of vulcanizate to the mold relative to cohesive strength of the vulcanizate. Vulcanizates with decachlorobutane as the curing agent are free from certain of the disadvantages associated with peroxide vulcanizates.

The use of peroxide curatives for polymers is not favored due to their comparative high cost, unpleasant odors developed during cure and retained afterwards and the danger of explosion. On the other hand, decachlorobutane vulcanizates have a high state of cure, which produces a superior product and eliminates problems associated with low state of cure. These problems include mold stain, rough vulcanizate surface, poor mold release, poor properties at high filler loadings, low tensile strength and brittleness at low temperature. Thus, the decachlorobutane curative of this invention produces superior vulcanizates as compared to other chlorocarbons, yet is free of the drawbacks of the costly peroxide curatives.

Various changes and modifications may be made in the method of this invention and in the composition ratios of this invention. Certain preferred forms which have been described, and equivalents may be substituted and not depart from the spirit and scope of this invention. These modifications are to be regarded as within the srope of this invention.

What is claimed is:

1. A composition which can be vulcanized comprising decachlorobutane in combination with sulfur and an elastomeric hydrocarbon polymer.

2. A composition which can be vulcanized comprising from 0.1 to 30 parts of decachlorobutane in combination with from 0.1 to 10 parts of sulfur and an elastomeric composition containing 100 parts of elastomeric hydrocarbon polymer.

3. A composition which can be vulcanized comprising decachlorobutane and a metallic accelerator in combination with sulfur and an elastomeric hydrocarbon polymer.

4. A composition which can be vulcanized comprising decachlorobutane in combination with sulfur and a saturated polymer derived from an alpha olefin.

5. A composition which can be vulcanized comprising decachlorobutane in combination with sulfur and ethylene propylene copolymer.

6. A composition which can be vulcanized comprising decachlorobutane in combination with sulfur and polyethylene.

7. A composition which can be vulcanized comprising decachlorobutane in combination with sulfur and ethylene propylene terpolymer.

8. A composition which can be vulcanized comprising decachlorobutane in combination with sulfur and polyisobutylene.

9. A composition which can be vulcanized comprising decachlorobutane in combination with sulfur and polybutadiene.

10. A process of vulcanizing a polymerizate derived from an alpha olefin which comprises heating the same in the presence of decachlorobutane and sulfur at a temperature and for a time sufficient to vulcanize the polymerizate.

11. A process of vulcanizing a polymerizate wherein the polymerizate contains 100 parts of a polymer derived from an alpha olefin which comprises heating the same in the presence of from 0.1 to 30.0 parts of decachlorobutane and 0.1 to 10.0 parts of sulfur at a temperature from about 120 to about 195 degrees centigrade for 2 to 90 minutes.

12. A process of vulcanizing a polymerizate derived from an alpha olefin which comprises heating the same in the presence of decachlorobutane, sulfur and a metallic accelerator at a temperature and for a time sufficient to vulcanize the polymerizate.

13. A process of vulcanizing a polymerizate wherein the polymerizate contains 100 parts of a polymer derived from an alpha olefin which comprises heating the same in the presence of from 0.1 to 30.0 parts of dechlorobutane, 0.1 to 10.0 parts of sulfur, and from 0.1 to 10.0 parts of a metallic accelerator at a temperature from about 120 to 195 degrees centigrade for 2 to 90 minutes.

14. A reaction product of an elastomeric hydrocarbon polymer with decachlorobutane and sulfur.

15. A rubbery heat reaction product of an elastomeric hydrocarbon polymer with decachlorobutane, sulfur and a metallic accelerator resulting from heating a mixture of the polymer, decachlorobutane, sulfur and metallic accelerator.

16. A molded heat reaction product of an elastomer derived from an alpha olefin with decachlorobutane and sulfur resulting from heating a mixture of 100 parts of elastomer, from 0.1 to 30.0 parts of decachlorobutane and from 0.1 to 10.0 parts of sulfur at a temperature and for a time sufficient to react the mixture.

17. A molded heat reaction product of an elastomer derived from an alpha olefin with decachlorobutane, sulfur and a metallic accelerator resulting from heating a mixture of 100 parts of elastomer, from 0.1 to 30.0 parts of decachlorobutane, from 0.1 to 10.0 parts of sulfur and from 0.1 to 10 parts of a metallic accelerator at a temperature and for a time sufficient to react the mixture.

References Cited

UNITED STATES PATENTS

| 3,317,440 | 5/1967 | Wei et al. | 260—79.5 |
| 3,329,649 | 7/1967 | Wei et al. | 260—79.5 |

FOREIGN PATENTS

| 725,634 | 3/1955 | Great Britain. |
| 623,891 | 4/1963 | Belgium. |

JOSEPH L. SCHOFER, *Primary Examiner.*

D. K. DENENBERG, *Assistant Examiner.*